United States Patent

[11] 3,624,506

[72] Inventor John S. Townsend
124 S. Douglas St., Wilson, N.C. 27893
[21] Appl. No. 21,720
[22] Filed Mar. 23, 1970
[45] Patented Nov. 30, 1971

[54] TWO-WAY ELECTRONIC FREQUENCY CONVERTER
2 Claims, 3 Drawing Figs.

[52] U.S. Cl. .................... 325/18,
325/430, 325/442, 325/450, 325/451, 332/31 T
[51] Int. Cl. .................... H03d 7/14
[50] Field of Search .................... 325/18, 19,
20, 430, 442, 450, 451; 321/60, 65; 332/31 T, 31
R, 43 R, 43 B, 44, 47; 329/1

[56] References Cited
UNITED STATES PATENTS

| | | | |
|---|---|---|---|
| 2,890,418 | 6/1959 | Zawels .................... | 332/47 X |
| 2,505,655 | 4/1950 | Van Weel .................... | 325/18 X |
| 2,431,212 | 11/1947 | Varone .................... | 325/20 |

*Primary Examiner*—Benedict V. Safourek
*Attorney*—Smith, Michael, Bradford & Gardiner

ABSTRACT: A two-way electronic frequency converter is operable in forward or reverse modes without switching.

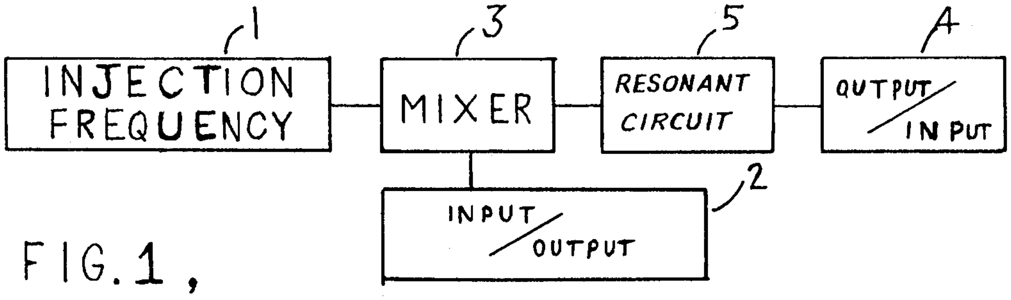
FIG. 1,
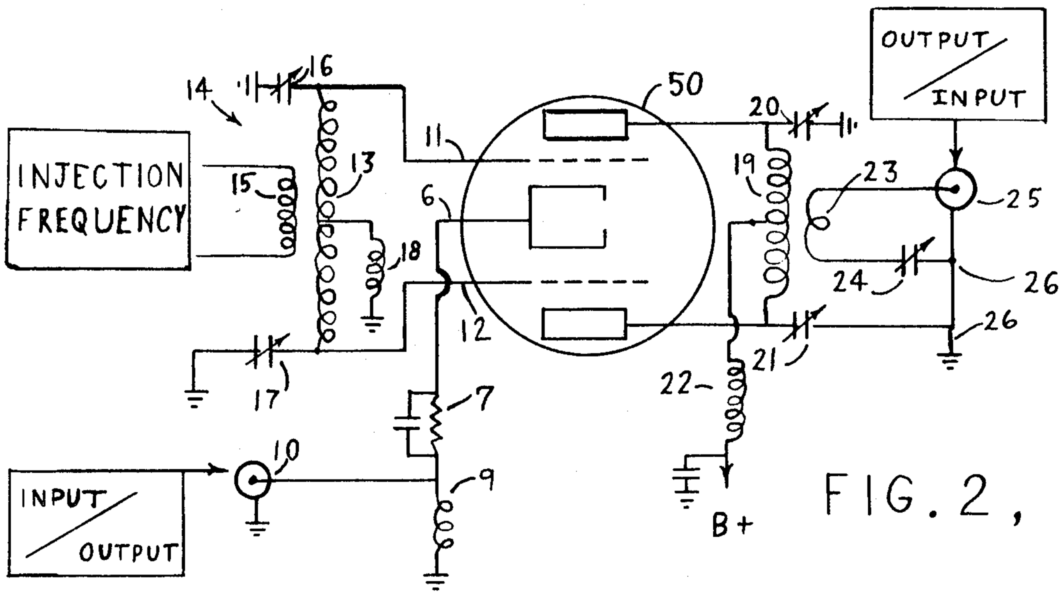
FIG. 2,
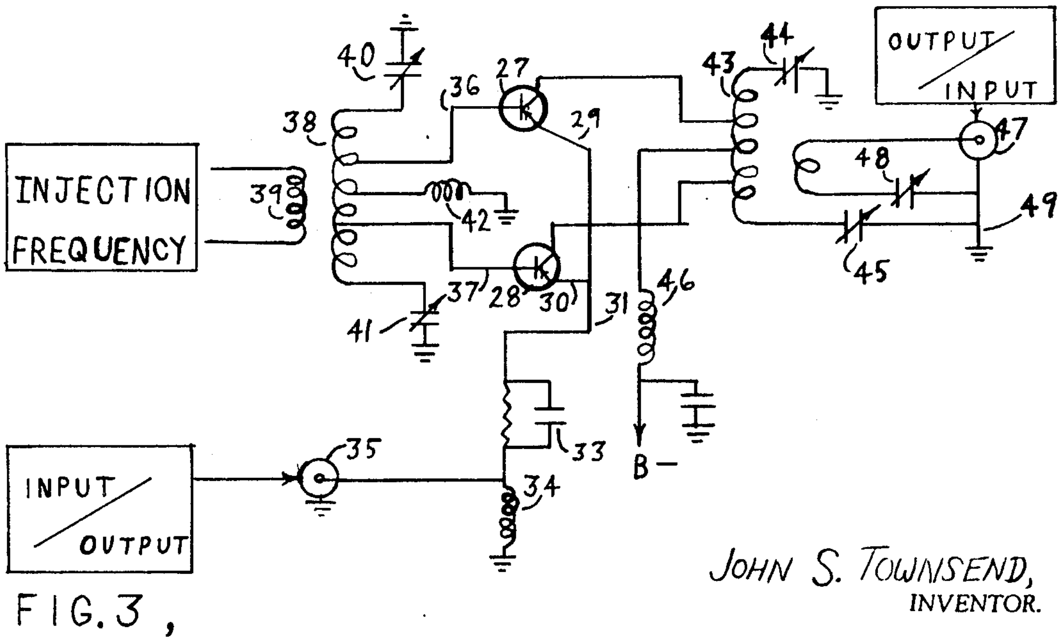
FIG. 3,
JOHN S. TOWNSEND,
INVENTOR.
BY Smith Michael
Bradford & Gardiner

TWO-WAY ELECTRONIC FREQUENCY CONVERTER

BACKGROUND OF THE INVENTION—PRIOR ART

In various electronic arts, particularly in the field of radio transceivers, it frequently becomes desirable to covert the frequency of both transmitted and received signals in order to make use of desired or assigned transmission frequencies while at the same time using transceivers designed for another frequency. Hence, transceivers have been designed for this purpose, as exemplified by the disclosure of VanWeel U.S. Pat. No. 2,505,655 wherein switching means selectively activates a local oscillator in a receiving mode and activates a negative damping means in a transmit mode. In the receive mode, circuit functions as a mixer and in the transmit mode the same circuit functions as the carrier frequency oscillator.

In U.S. Pat. No. 3,219,931 issued Nov. 13, 1965 to George V. Lennon, III, et al., there is disclosed a bilateral converter which operates as a balanced modulator when transmitting information and as a product detector or mixer when receiving information. As in the case of the VanWeel disclosure, it is necessary to mechanically switch the circuitry between transmit and receive modes in order to change the character of the circuit so as to accomplish the aforementioned distinct functions.

In contradistinction to the aforementioned disclosures, this invention provides a converter which acts as a mixer in both transmit and receive modes and requires no switching between modes, and has among its objects the following:

1. The provision of a converter which is readily applicable to existing transceivers without internal circuit modification thereof, 2. The provision of a converter which operates in transmit or receive mode without switching therebetween, 3. The provision of a two-way frequency converter comprising a mixer operable in one mode to provide a sum of the frequencies of the inputs, and in a reverse mode to provide a difference between frequencies of inputs.

The foregoing, and other self-evident advantages and objects of the invention will be better understood by a consideration of the ensuing specification and the accompanying drawings which illustrate a preferred embodiment of the invention, and in which, FIG. 1 is a block diagram depicting the function of the component circuitry of this invention, FIG. 2 is a schematic representation of one embodiment of the invention, and FIG. 3 is a schematic representation of a second embodiment of the invention.

Referring first to FIG. 1, there is provided a source of injection frequency 1 which may be a local oscillator (not shown) or an external alternating current signal source (not shown). Also provided is an input/output 2 which generally would comprise a conventional transceiver (not shown). The term input/output as used herein signifies that the circuit functions as an input to the converter in a first mode (e.g., transmit), and as an output from the converter in a second mode (e.g., receive). Common to these two circuits is a heterodyne circuit or mixer 3, which functions as a mixer in both modes of converter operation. The converter is further provided with an output/input 4 circuit which functions conversely to the circuit 2, i.e., the output/input circuit 4 functions as an output in the first mode (transmit) and as an input in the second mode (receive). A resonant circuit 5 may be interposed between the mixer 3 and the output/input 4 in order to isolate the frequency components of the respective circuits.

Referring now to FIG. 2 for a more detailed consideration of a specific embodiment of the invention, the mixer 3 comprises a tube 50, preferably a dual triode such as a 6J6. The cathodes of each tube are commoned at 6, and the common cathode circuit includes a bias resistor 7 and a bypass condenser 8 in shunt thereto. Interconnecting the bias resistor 7 with ground is a radio frequency choke 9 which serves to isolate radio frequencies appearing at an input/output terminal 10 connected to the juncture of the bias resistor 7 and the choke 9.

The grid circuits 11, 12 of the mixer tube 50 are fed in push-pull from the secondary 13 of an injection frequency transformer generally indicated at 14. The injection frequency is derived from a source (not shown) and coupled to secondary 13 from primary 15 of the transformer. The secondary circuit is turned to resonance at the injection frequency by virtue of variable condensers 16 and 17, and is isolated from ground by radio frequency choke 18 interconnecting the midpoint thereof with ground.

The plate circuit common to both tubes also comprises a resonant push-pull circuit, and includes transformer winding 19, variable condensers 20, 21, and isolating radio frequency chock 22 interconnecting the midpoint of winding 19 and a source of direct current designated B+. The push-pull plate circuit is tuned to resonance at the output/input frequency and is coupled to the output/input terminal 25 through winding 23 and a variable condenser 24. This coupling circuit, grounded at 26, comprises a trap for frequencies other than the output/input frequency.

In operation during a first mode, which is considered to be a transmit mode for the purpose of explanation, a source of intelligence-bearing signals is connected to input/output terminal 10 and thus applied to the commoned cathodes of each triode of mixer tube 50. For the purpose of illustration only, this frequency may be said to be a transmitter providing a modulated carrier of 30 megahertz which is to be converted and retransmitted on a carrier of 110 megahertz.

The injection frequency source is tuned to provide a frequency of 80 megahertz to the grid circuits of the triodes in push-pull. By known principles of heterodyning, the resultant signals appearing in the plate circuit comprise the sum and difference frequencies of the two inputs, and the desired frequency (in this case the sum of 30+80 megahertz, or 110 megahertz) is passed to the output/input terminal by operation of the resonant plate circuit and wave trap. The output/input circuit in turn is connected to the transmission media, such as an antenna or transmission line (not shown).

In operation during a second mode, considered to be a receive mode, it is desired to receive a signal at the output/input terminal at 110 megahertz and convert it to 30 megahertz before applying it to the transceiver at the input/output terminal 10. The 110-megahertz signal is stepped up in amplitude through transformer 19, 23 and superimposed on the plate circuit signal, which in turn is being modulated at the injection frequency of 80 megahertz as applied to the grids 11, 12 of the dual triode 50. Mixing of the weaker input signal with the strong injection signal is accomplished in the plate circuit resulting in a difference frequency which appears across choke 9. This difference frequency is of approximately the same amplitude as the incoming weaker signal frequency, thus a 110-megahertz signal of 1 microvolt amplitude would produce a resultant output of 30 megahertz at approximately 1 microvolt.

In the second embodiment depicted in FIG. 3, similar circuitry is provided utilizing transistors 27, 28, such as a TIXMIO. In this embodiment, the emitters 29, 30 are commoned in cathode circuit 31, which is provided with a biasing resistor 32 and a shunt capacitor 33. The biasing resistor is connected to ground through isolating radio frequency choke 34, and the input/output terminal 35 is connected to the juncture of the bias resistor 32 and choke 34.

The base circuits 36, 37 of the transistors are fed in push-pull from the secondary 38 of the injection frequency transformer which derives the injection frequency from a source (not shown) connected to the primary 39. The secondary circuit is tuned in resonance at the injection frequency by virtue of variable condensers 40, 41, which, with the terminal portions of winding 38 form series resonant circuits to ground. The midpoint of the secondary is returned to ground to complete the DC bias circuit for the transistors, but is isolated from ground at the injection frequency by choke 42.

The collector circuit common to both transistors comprises a resonant push-pull circuit including transformer winding 43, variable condensers 44, 45 which with the terminal portions of the winding establish series resonant paths to ground, and a radio frequency isolating choke 46 interconnecting the mid-point of winding 43 and a source of direct current designated B+. The push-pull collector circuit is tuned to resonance at the output/input frequency and is coupled to the output/input terminal 47 through winding 48 and a variable condenser 48. This coupling circuit, grounded at 49, comprises a trap for frequencies other than the output/input frequency.

The operation of this embodiment is identical to that of FIG. 2, and reference is made to the description of operation of that embodiment as presented in the foregoing discussion.

While the foregoing description is believed adequate to enable one having skill in the art to construct an apparatus embodying this invention, the following component values are offered in the way of suggestion, it being recognized that considerable latitude exists in the choice of circuit parameters depending on particular frequencies and other design factors familiar to those skilled in this art:

| Ref. numeral | Parameter |
|---|---|
| 5 | tube 6J6 |
| 7 | Resistor 1,800 ohms |
| 8 | Condenser 0.001 mfd. |
| 9 | Choke 1.5 mh. |
| 16, 17, 20, 21 | condenser, 20 mmf., variable |
| 18 | choke, 100 μh. |
| 22 | choke, 100 μh. |
| 24 | condenser, 10 mmf., variable |
| 32 | resistor, 150 ohms |
| 33 | condenser, 0.01 mf. |
| 34 | choke, 1.5 mh. |
| 40, 41, 44, 45 | condensers, 20 mmf., variable |
| 42, 46 | choke, 100 μh. |
| 48 | condenser, 10 mmf., variable |

The embodiments described herein are merely exemplary of preferred circuitry used in the practice of this invention, and are not to be considered as the sole manner of application of the invention, the scope of which is to be determined by the following claims.

I claim:

1. A two-way electronic frequency converter operable without circuit changes in forward and reverse modes, said converter comprising a source of injection frequency, an input/output terminal and an output/input terminal functioning as an input to said converter when operating in the forward mode and as an output in said reverse mode and said output/input terminal functioning conversely thereto, electronic control means comprising emission means, control means, and collector means, a ground circuit, a first resonant circuit coupling said source of injection frequency and said control means and RF choke means interconnecting said first resonant circuit and ground, means directly interconnecting said input/output terminal and said emission means, RF choke means connected between the point of said last-named interconnection and ground, and a second resonant circuit interconnecting said output/input terminal and said collector means.

2. A two-way electronic frequency converter as set forth in claim 1 including a pair of said electronic control means connected to said first and second resonant circuits in push-pull, each said choke means being common to both sides of said push-pull circuit.

* * * * *

UNITED STATES PATENT OFFICE

CERTIFICATE OF CORRECTION

Patent No. 3,624,506 Dated November 30, 1971

Inventor(s) John S. Townsend

It is certified that error appears in the above-identified patent and that said Letters Patent are hereby corrected as shown below:

Claim 1, line 4, after "terminal" (second occurrence), insert --, said input/output terminal--.

Signed and sealed this 11th day of April 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334